(12) United States Patent
Graetz et al.

(10) Patent No.: US 11,101,479 B2
(45) Date of Patent: Aug. 24, 2021

(54) SYSTEM AND METHOD FOR STORING HYDROGEN

(71) Applicant: The Boeing Company, Chicago, IL (US)

(72) Inventors: Jason Graetz, Calabasas, CA (US); Adam E. Sorensen, Moorpark, CA (US); John J. Vajo, West Hills, CA (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 16/453,713

(22) Filed: Jun. 26, 2019

(65) Prior Publication Data

US 2020/0411888 A1  Dec. 31, 2020

(51) Int. Cl.
*H01M 8/065* (2016.01)
*H01M 8/04082* (2016.01)

(52) U.S. Cl.
CPC ....... *H01M 8/065* (2013.01); *H01M 8/04208* (2013.01)

(58) Field of Classification Search
CPC .......................... H01M 8/065; H01M 8/04208
See application file for complete search history.

(56) References Cited

U.S. PATENT DOCUMENTS

| 7,241,331 | B2 | 7/2007 | Wu et al. |
| 8,100,993 | B2 | 1/2012 | Fisher et al. |
| 2009/0155648 | A1 | 6/2009 | Lee et al. |
| 2011/0200495 | A1 | 8/2011 | Braithwaite et al. |
| 2013/0196243 | A1 | 8/2013 | Braithwaite et al. |
| 2015/0064585 | A1* | 3/2015 | Hyde ............... H01M 8/04216 429/421 |

FOREIGN PATENT DOCUMENTS

WO  2014/126456 A1  8/2014

OTHER PUBLICATIONS

Graetz et al. (Journal of Alloys and Compounds, vol. 743, Apr. 30, 2018, pp. 691-696).*

* cited by examiner

*Primary Examiner* — Olatunji A Godo
(74) *Attorney, Agent, or Firm* — MH2 Technology Law Group LLP

(57) ABSTRACT

A system includes a canister and a fuel cell. The canister defines an internal volume configured to have a hydride bed positioned therein. The canister includes at least 1.0 kWH/kg of energy based on a heating value of 120 kJ/g of hydrogen present. The hydride bed includes lithium aluminum hydride, aluminum hydride, or a combination thereof. The hydride bed is configured to release hydrogen gas when heated to a predetermined temperature. The fuel cell is configured to receive the hydrogen gas from the canister and to use the hydrogen gas as fuel to produce power for a load.

23 Claims, 8 Drawing Sheets

_SYSTEM AND METHOD FOR STORING HYDROGEN_

FIELD OF THE DISCLOSURE

The present disclosure is directed to systems and methods for storing hydrogen. More particularly, the present disclosure is directed to systems and methods for powering a load using stored hydrogen.

BACKGROUND

Hydrogen fuel cell systems offer the possibility of high specific energies (e.g., >800 Wh/kg), but hydrogen storage remains a challenge and limits scalability. The most common hydrogen storage method employed today uses high-pressure (e.g., typically carbon fiber) hydrogen tanks. Although this storage method has a reasonable specific energy and energy density at large scale (e.g., >50 kWh), it is often too heavy and too spacious at medium and small scales (e.g., <10 kWh). In addition, the high pressure requirement limits the design flexibility of the storage system.

SUMMARY

A canister is disclosed. The canister includes a body defining a single, contiguous internal volume configured to have a hydride bed positioned therein. The hydride bed includes lithium aluminum hydride, aluminum hydride, or a combination thereof. A scaling factor of the canister is greater than about 0.5 and less than about 1.0. The scaling factor refers to a mass of the hydride bed divided by a mass of the canister with the hydride bed therein. The canister includes at least 1.0 kWH/kg of energy. A first heater element is positioned at least partially in the internal volume and embedded at least partially within the hydride bed. The first heater element is configured to heat the hydride bed substantially uniformly, thereby causing the hydride bed to release hydrogen. A first temperature sensor is positioned at least partially in the internal volume. The first temperature sensor is configured to measure a temperature in the internal volume.

A system is also disclosed. The system includes a canister and a fuel cell. The canister defines an internal volume configured to have a hydride bed positioned therein. The canister includes at least 1.0 kWH/kg of energy based on a heating value of 120 kJ/g of hydrogen present. The hydride bed includes lithium aluminum hydride, aluminum hydride, or a combination thereof. The hydride bed is configured to release hydrogen gas when heated to a predetermined temperature. The fuel cell is configured to receive the hydrogen gas from the canister and to use the hydrogen gas as fuel to produce power for a load.

A method is also disclosed. The method includes storing a hydride bed in a canister. The method also includes heating the hydride bed with a first heater element in the canister, which causes the hydride bed to release hydrogen gas. The method also includes transferring the hydrogen gas from the canister to a fuel cell. The method also includes generating power with the fuel cell using the hydrogen gas as fuel. The method also includes providing the power from the fuel cell to a load to power the load.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
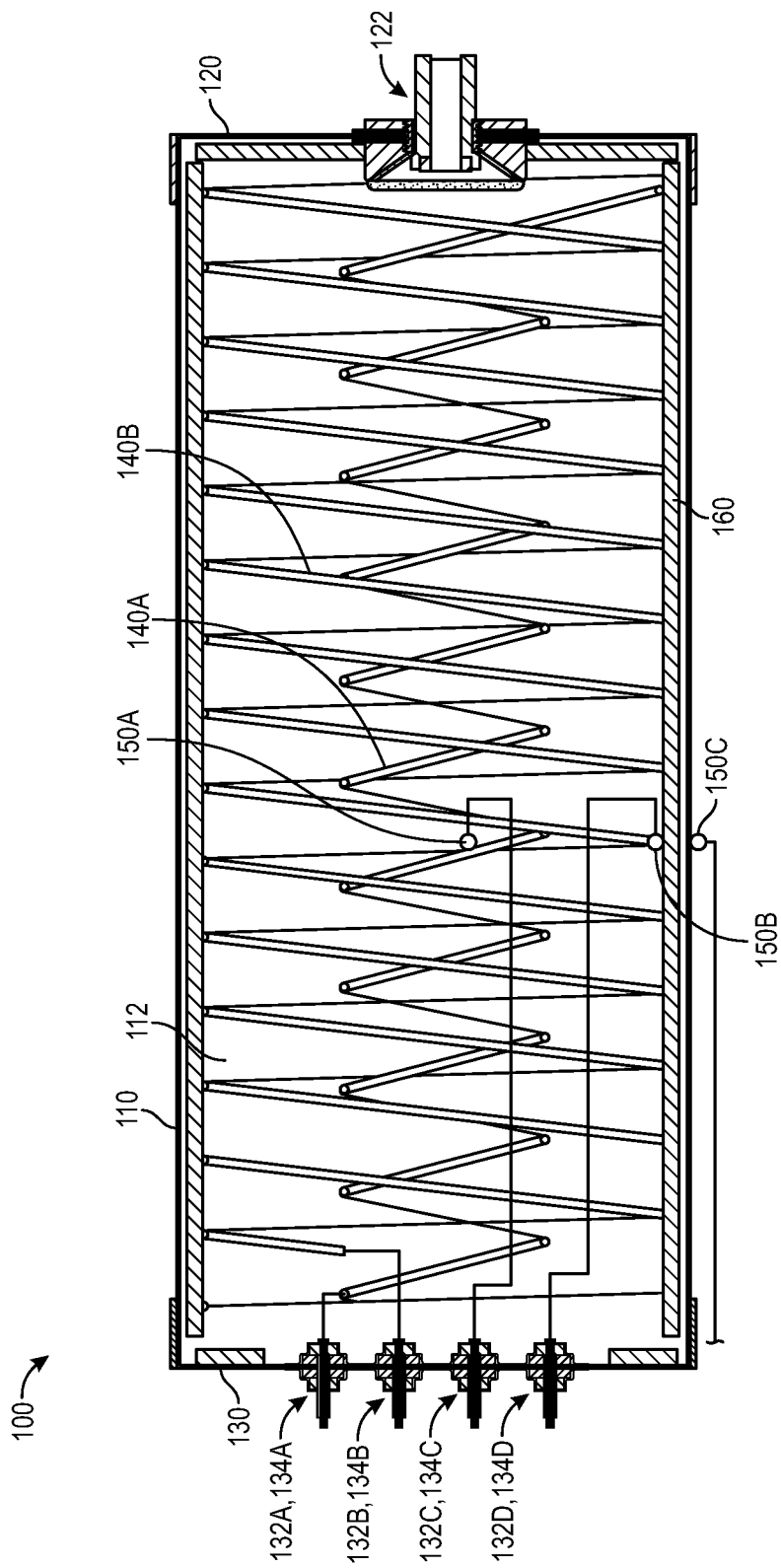
FIG. 1 illustrates a schematic view of a hydride canister, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed a system for storing hydrogen. As described in greater detail below, the system may include a canister (also referred to as a hydride canister) 100, which is shown in FIG. 1. The canister 100 may serve as a hydrogen carrier for proton-exchange membrane (PEM)

fuel cells. When coupled with such a fuel cell, the canister 100 may be capable of delivering 1000 Wh/kg of energy or more. The canister 100 and fuel cells may be used in, for example, electric and hybrid-electric passenger aircrafts, unmanned aerial and/or underwater vehicles, auxiliary power units, and emergency power units.

The phrase "single, contiguous" refers to one item (e.g., volume) that is undivided. The phrase "internal volume" refers to the space or volume inside the canister 100. The phrase "hydride bed" refers to a collection of hydride within the internal volume. The hydride refers to an anion of hydrogen. It may also be known as a compound in which one or more hydrogen centers have nucleophilic, reducing, or basic properties. The hydride bed may be in a solid state, a liquid state, a gas state, or a combination thereof.

The canister 100 may include a body 110 that is made from metal such as aluminum, stainless steel, or other like metals, or non-metal such as a resin or the like. The body 110 may be in the shape of a cylinder, a sphere, etc. The body 110 defines an internal volume 112. The internal volume 112 may be a single, contiguous internal volume, or a plurality of internal volume portions that are separated by dividers. Hydrogen may be stored in the internal volume 112 in a liquid or solid state. For example, the hydrogen may be stored as a metastable hydride bed in the internal volume 112. The hydride bed may be made from or include, for example, lithium aluminum hydride ($LiAlH_4$) and/or aluminum hydride ($AlH_3$). The hydride bed may have a mass from about 0.3 kg to about 20 kg.

The hydride bed may have a gravimetric density from about 1 to about 15 wt % H, or from about 3 to about 10 wt % H. The hydride bed may have a volumetric density from about 10 to about 120 $kg/m^3$, or from about 50 to about 100 kg/m3, or from about 70 to about 100 kg/m3, or greater than 70 $kg/m^3$ on a material basis. The hydride bed may have a desorption temperature from about 80° C. to about 200° C., or from about 10 to about 150° C. As described in greater detail below, the hydride bed may be thermally decomposed to release hydrogen gas from the canister 100. The hydrogen gas may have a pressure from about 1 bar to about 1000 bar when released from the canister 100.

The body 110 may include a first (e.g., upper) end 120 and a second (e.g., lower) end 130. The first and second ends 120, 130 may be integral with the body 110. In another implementation, the first and second ends 120, 130 may be or include end caps that are coupled (e.g., screwed or adhered) to the body 110.

The first end 120 of the body 110 may include or define one or more fluid openings (one is shown: 122) through which the hydrogen and/or hydride may flow. For example, hydrogen and/or hydride may be introduced into the internal volume 112 through the fluid opening 122. Similarly, hydrogen and/or hydride may flow out of the internal volume 112 through the fluid opening 122. The fluid opening 122 is described in greater detail below with respect to FIG. 2.

The second end 130 of the body 110 may include or define one or more cable openings (four are shown: 132A, 132B, 132C, 132D). One or more of the cable openings 132A-132D may include a cable interconnect (four are shown: 134A, 134B, 134C, 134D) proximate thereto and/or extending at least partially therethrough (e.g., from an exterior of the body 110 to the internal volume 112). The cable interconnects 134A-134D may provide a hermetic seal. The cable openings 132A-D and cable interconnects 134A-134D are discussed in greater detail below with respect to FIG. 3.

The canister 100 may also include one or more heater elements (two are shown: 140A, 140B). In one implementation the heater elements 140A, 140B may be two portions of a single heater. The heater elements 140A, 140B may be or include resistive wires that may be oriented as coils, a zig-zag pattern, etc. The heater elements 140A, 140B may extend from an exterior of the body 110, through the cable openings 132A, 132B and/or the cable interconnects 134A, 134B, to the internal volume 112. The heater elements 140A, 140B may be positioned or embedded at least partially within the hydrogen and/or the hydrogen bed in the internal volume 112. The heater elements 140A, 140B may be configured to heat the hydrogen and/or the hydride bed in the internal volume 112 substantially uniformly to a temperature between about 120° and about 200° C. Substantially uniform heating enables the rate of hydrogen evolution to be determined from the temperature of the hydride bed and the composition (determined from previous measurements of the rate) by using a previously-determined rate equation or look-up table. In the example shown in FIG. 1, the heater elements 140A, 140B include electrically-insulated heater wires that are wrapped in helical coils inside the internal volume 112. The heater elements 140A, 140B may be powered by a single source. The heater element 140A may be positioned (e.g., radially) inward from an inner surface of the body 110, and the heater element 140B may be positioned (e.g., radially) outward from the heater element 140A and/or in contact with the inner surface of the body 110. In an alternative implementation, the heater elements 140A, 140B may be or include internal plates, fins, or the like.

The canister 100 may also include one or more temperature sensors (three are shown: 150A, 150B, 150C). The temperatures sensors may be or include, for example, thermocouples. The temperature sensors 150A, 150B may extend from an exterior of the body 110, through the cable openings 132C, 132D and/or the cable interconnects 134C, 134D, to the internal volume 112. The temperature sensors 150A, 150B may be configured to measure the temperature of the hydrogen and/or the hydride bed in the internal volume 112. In the example shown in FIG. 1, the first temperature sensor 150A may be coupled to the first heater element 140A and positioned (e.g., radially) inward from the inner surface of the body 110. The second temperature sensor 150B may be coupled to the second heater element 140B and/or the inner surface of the body 110. The third temperature sensor 150C may be coupled to an outer surface of the body 110.

The canister 100 may also include insulation 160 positioned inside and/or outside of the body 110. The insulation 160 may reduce the amount of heat that is transmitted through the body 110 to the environment. The insulation 160 may be or include a blanket (e.g., fiberglass or aerogel), a foam mold, or an external spray-on or paint-on foam. In another implementation, the insulation 160 may be in the form of thermos or dewar where the insulating effect is achieved through an evacuated wall.

As described in greater detail below, the heater elements 140A, 140B may heat the hydride bed in the internal volume 112, which may cause the hydride bed to release hydrogen gas. The rate of conversion to hydrogen gas may be (e.g., directly) proportional to the temperature of the hydride bed. The temperature sensors 150A, 150B may measure the temperature (e.g., of the hydride bed) in the internal volume 112, and the amount of heat generated by the heater elements 140A, 140B may be controlled (e.g., increased, decreased, or maintained) to control the rate of conversion to hydrogen gas. For example, the rate may be increased by increasing the temperature, and the rate may be decreased by decreasing the temperature.

Figure 2:
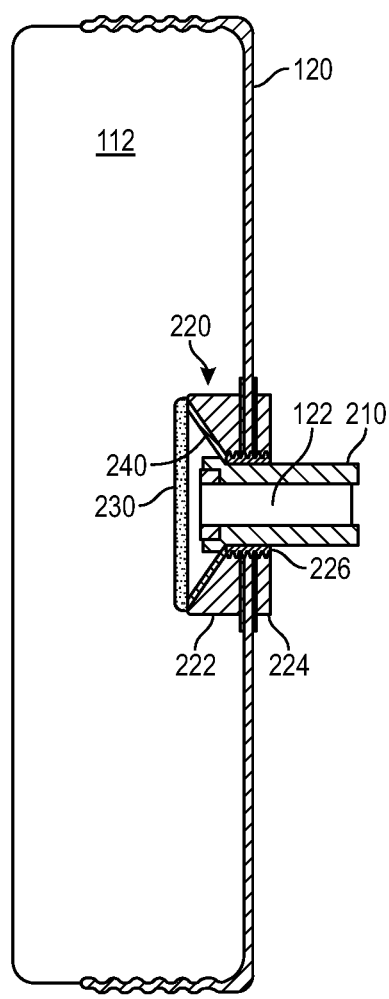
FIG. 2 illustrates a schematic view of a first end (e.g., a first end cap) of the canister, according to an implementation.

FIG. 2 illustrates a schematic view of a portion of the canister 100 showing the first end 120 of the body 110 including the fluid opening 122, according to an implementation. A hollow tube 210 may extend at least partially through the fluid opening 122. The tube 210 may be made of, for example, silicone.

A flange adapter 220 may be coupled to the first end 120 of the body 110 and/or the tube 210. The flange adapter 220 may be made from, for example, aluminum. The flange adapter 220 may include an inner (e.g., flange) portion 222, an outer (e.g., nut) portion 224, and a connector 226. The inner portion 222 may be positioned in the internal volume 112. The inner portion 222 may be conical or frustoconical to funnel the hydrogen into the tube 210. The outer portion 224 may be positioned outside of the body 110. The connector 226 may extend at least partially through the fluid opening 122. As shown, the connector 226 may be positioned at least partially around the tube 210. The inner portion 222 and the outer portion 224 may be coupled (e.g., screwed) to the connector 226.

A filter 230 may be coupled to the flange adapter 220. As shown, the filter 230 may be positioned in the internal volume 112 and coupled to the inner portion 222 of the flange adapter 220. In another implementation, the filter 230 may be positioned outside the body 110 and coupled to the outer portion 224 of the flange adapter 220. The filter 230 may be configured to prevent particles that are greater than or equal to a predetermined size from flowing through the fluid opening 122 and to an exterior of the body 110. The predetermined size may be from about 0 µm to about 10 µm (e.g., about 2 µm). The filter 230 may be or include a gasket made of fritted nickel. An inner end of the tube 210 may be positioned in the internal volume 112 between the fluid opening 122 and the filter 230.

In at least one implementation, a scrubber may also be coupled to and/or positioned proximate to the flange adapter 220. The scrubber may remove gaseous and/or molecular impurities from the gas stream. More particularly, the filter 230 may remove particles, and the scrubber may remove gaseous species (e.g., water vapor, hydrocarbons, etc.).

An adhesive 240 may be applied to surfaces of the body 110, the tube 210, the flange adapter 220 (e.g., the inner portion 222, the outer portion 224, and/or the connector 226), the filter 230, or a combination thereof to create a hermetic seal around the fluid opening 122 at temperatures from about 0° C. to about 250° C. or from about 25° C. to about 200° C. For example, the adhesive 240 may be applied between the inner portion 222 of the flange adapter 220 and an inner surface of the body 110, between the inner portion 222 of the flange adapter 220 and the filter 230, between the outer portion 224 of the flange adapter 220 and an outer surface of the body 110, between the tube 210 and the connector 226, or the like.

Figure 3:
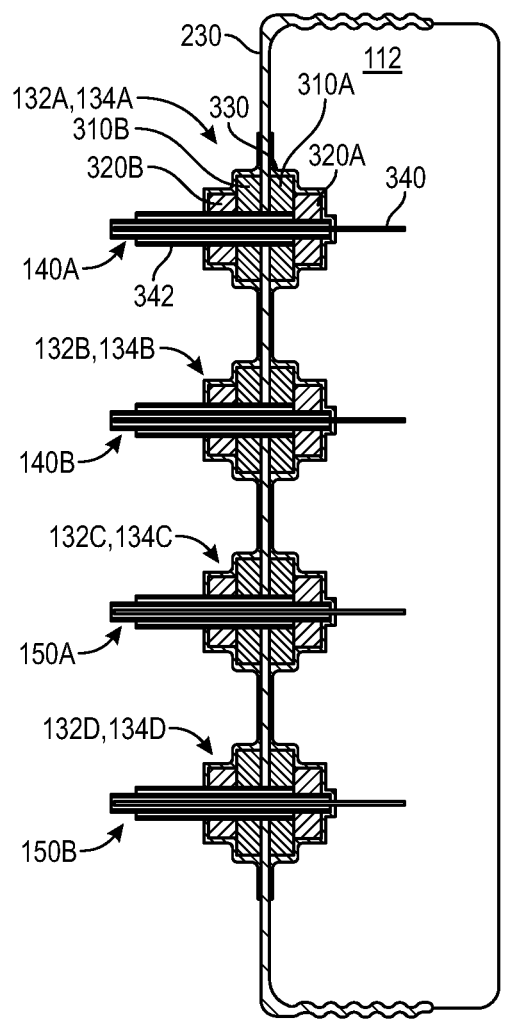
FIG. 3 illustrates a schematic view of a portion of a second end (e.g., a second end cap) of the canister, according to an implementation.

FIG. 3 illustrates a schematic view of a portion of the canister 100 showing the second end 130 of the body 110 including the cable openings 132A-132D and the cable interconnects 134A-134D, according to an implementation. For the sake of simplicity, a single cable opening 132A and a single cable interconnect 134A are described below. It will be appreciated that one or more of the other cable openings 132B-132D may be the same as or different from the cable opening 132A, and one or more of the other cable interconnects 134B-134D may be the same as or different from the cable interconnect 134A. In at least one implementation, the cable interconnects 134C, 134D may be omitted. In embodiments, there may be from 2 to about 10 cable openings and corresponding interconnectors, or from about 3 to about 6 cable openings and corresponding interconnectors, or from about 4 to about 5 cable openings and corresponding interconnectors.

The cable interconnect 134A may include one or more washers. For example, a first (e.g., inner) washer 310A may be positioned in the internal volume 112, and a second (e.g., outer) washer 310B may be positioned outside of the first end 130 of the body 110. The washers 310A, 310B may be or include insulating washers made of, for example, silicone.

The cable interconnect 134A may also include one or more electrical connections, such as crimp connections. For example, the inner washer 310A may be positioned at least partially between a first (e.g., inner) electrical connection 320A and the inner surface of the body 110, and the outer washer 310B may be positioned at least partially between a second (e.g., outer) electrical connection 320B and the outer surface of the body 110.

The cable interconnect 134A may also include an adhesive 330. The adhesive 330 may be applied to surfaces of the body 110; the heater element 140A; the washers 310A, 310B; the electrical connections 320A, 320B, or a combination thereof. The adhesive 330 may create a hermetic seal around the cable opening 132A at temperatures from about 0° C. to about 250° C. or from about 25° C. to about 200° C.

As shown, the heater element 140A may extend through the cable opening 132A and the cable interconnect 134A (e.g., through the washers 310A, 310B and the electrical connections 320A, 320B). The heater element 140A may include a metallic wire 340. At least a portion of the wire 340 may be wrapped with a thermal insulator 342. The insulator 342 may be made from, for example, silicone. The thermal insulator 342 may be wrapped around a portion of the wire 340 that is outside the body 110. In addition, the insulator 342 may be wrapped around a portion of the wire 340 that is in the internal volume 112 and positioned within the wire interconnect 134A. As shown, a portion of the wire 340 that is in the internal volume 112 and not positioned within the wire interconnect 134A may not be wrapped with the thermal insulator 342, but may be coated with an electrical insulator. This unwrapped portion may heat the hydride bed in the internal volume 112.

Figure 4:
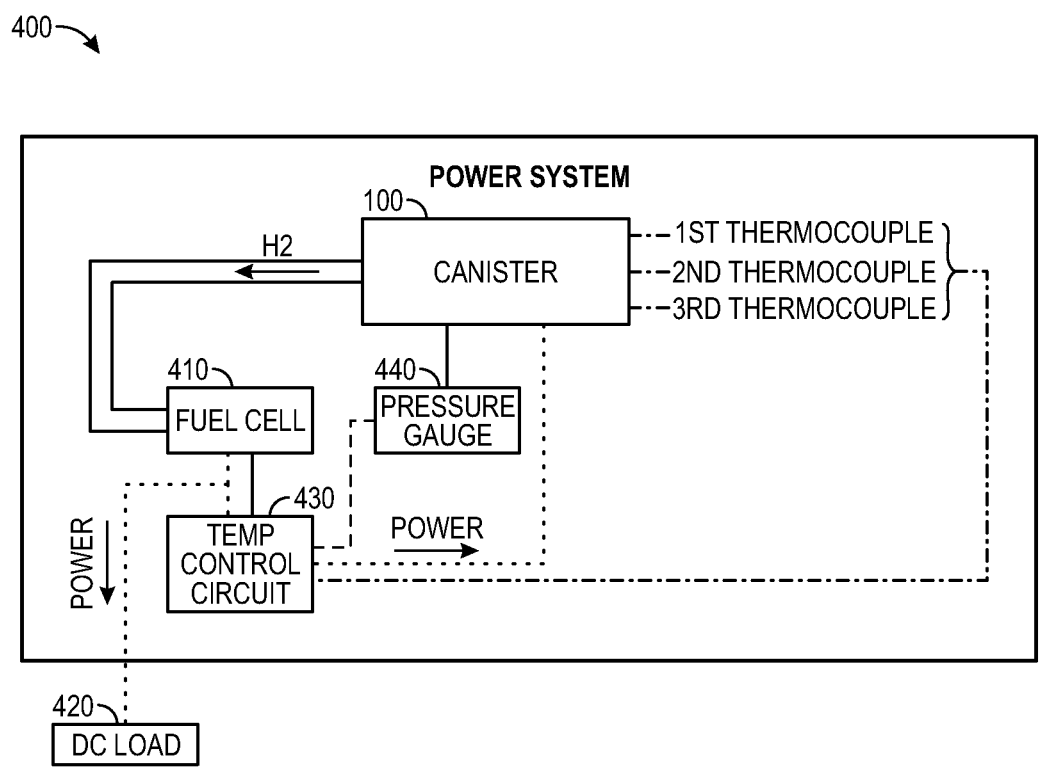
FIG. 4 illustrates a schematic view of a (e.g., power) system including the canister, according to an implementation.

FIG. 4 illustrates a schematic view of a (e.g., power) system 400 including the canister 100, according to an implementation. The system 400 may also include a fuel cell 410, which may receive hydrogen gas from the canister 100. The fuel cell 410 may use the hydrogen gas as fuel to generate power for the canister 100 and/or a (e.g., DC) load 420. In an alternative implementation, the canister 100 may also or instead receive power from an external DC power supply (e.g., a battery).

The system 400 may also include a temperature control circuit 430 that controls the amount of power provided (e.g., from the fuel cell 410) to the heater elements 140A, 140B. As discussed above, this controls the amount of heat generated in the internal volume 112 by the heater elements 140A, 140B, which controls the amount of hydrogen released from the canister 100 to the fuel cell 410. The temperature control circuit 430 may receive temperature measurements from the first temperature sensor 150A, the second temperature sensor 150B, and/or the third temperature sensor 150C as shown in FIG. 1.

The temperature control circuit 430 may be pre-programmed with a specific temperature profile, so that hydrogen from the canister 100 may be released at a predefined rate (e.g., 1 wt %/hr for 7 hours). In another implementation, the temperature control circuit 430 may be configured to adjust the amount of power provided to the heater elements 140A, 140B, and thus the temperature in the internal volume 112, and thus the amount of hydrogen released from the canister 100. The adjustment may be in response to a (e.g., varying) demand from the load 420. The adjustment may also or instead be in response to an integrated current of the power provided to the canister 100 and/or the load 420. The adjustment may also or instead be in response to an integrated flow of the hydrogen provided to the fuel cell 410. The adjustment may also or instead be in response to a pressure of the hydrogen in the canister 100 and/or a pressure of the hydrogen gas provided to the fuel cell 410. The pressure may be measured using, for example, a pressure gauge 440.

Example 1

A canister was assembled using a body made from aluminum in the shape of a cylinder, similar to that shown in FIG. 1. The body 110 included two end caps. The properties of the canister are provided in Tables 1-5 below. The heater coils each included a wire (e.g., Kanthal A-1, 20 gauge) that was insulated with Kapton. The heater coils were wrapped into a first (e.g., inner) coil and a second (e.g., outer) coil that extended the full length of the body. The heater coils were responsive to a temperature control circuit and uniformly heated the hydride bed.

The canister was filled with 160 g (317 mL) of $LiAlH_4$ catalyzed with TiF3 (3 mol %). Three thermocouples were used to monitor and/or control the temperature. More particularly, a first thermocouple was mounted on the inner heater coil, with the thermocouple end positioned substantially in the center of the hydride bed. A second thermocouple wire was mounted on the outer heater coil, just inside the inner insulation, with the thermocouple end fixed in close proximity to the insulated heater coil, functioning both as a monitor and control thermocouple. A third thermocouple was mounted on the outer surface of the body of the canister, to monitor the outside temperature of the canister.

The heater coil was controlled by the temperature control circuit, guided by the second (e.g., outer coil) thermocouple. All wires (e.g., two heater coils and two thermocouple wires) were fed into the canister through sealed wire interconnects to maintain a hermetic seal within the canister. Hydrogen gas was released through a fluid opening at one end of the canister. A filter gasket was used to prevent entrained particles from entering the hydrogen gas stream. The canister was designed with an aerogel insulation (details listed in Table 4) on the inside of the canister and end caps to prevent heat transfer to the outer wall and the environment. The total mass and volume of the canister with the hydride was 261 g and 330 mL, respectively. The total amount of hydrogen stored within the canister was 11.5 g, resulting in a system with 4.4 wt % H. The theoretical specific energy of the system was 1.59 kWh/kg based on the lower heating value of hydrogen.

Figure 5A:
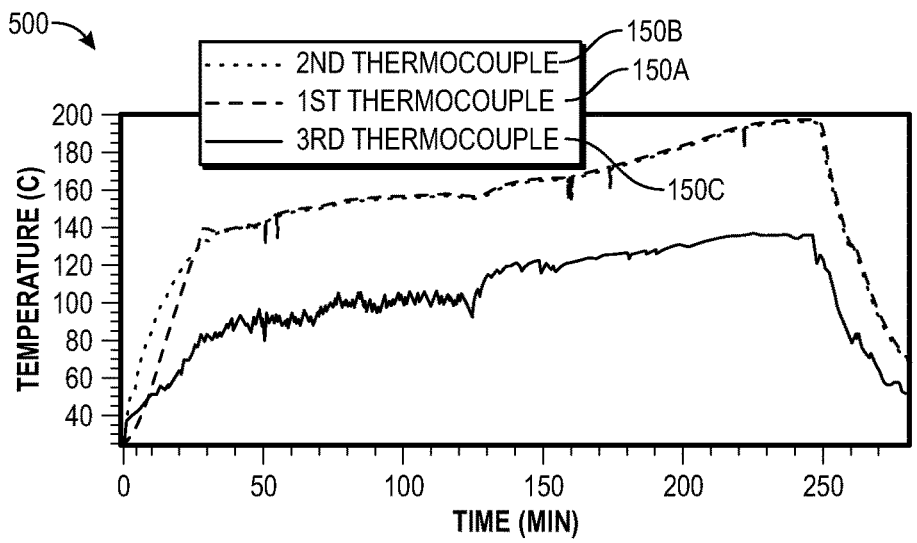
FIG. 5A illustrates a graph showing temperatures in the center of the canister, on the inner wall of the canister, and on an outer wall of the canister, according to an implementation.
Figure 5B:
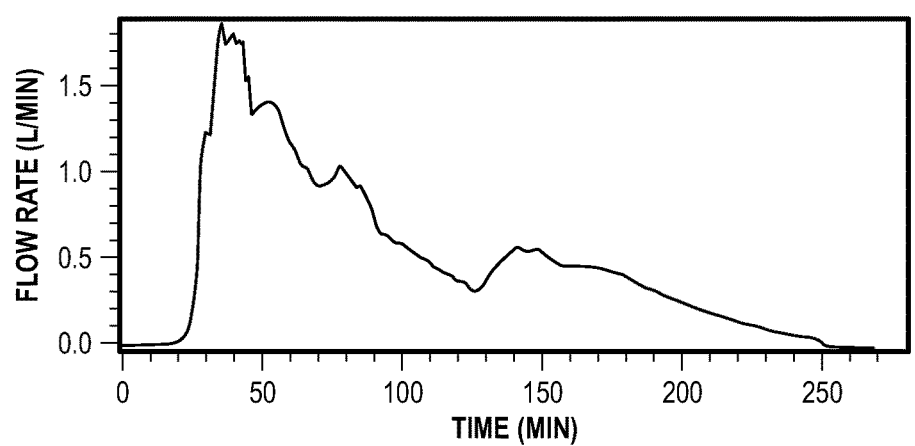
FIG. 5B illustrates a graph showing a hydrogen evolution rate (e.g., in L H2/min) from the canister, according to an implementation.
Figure 5C:
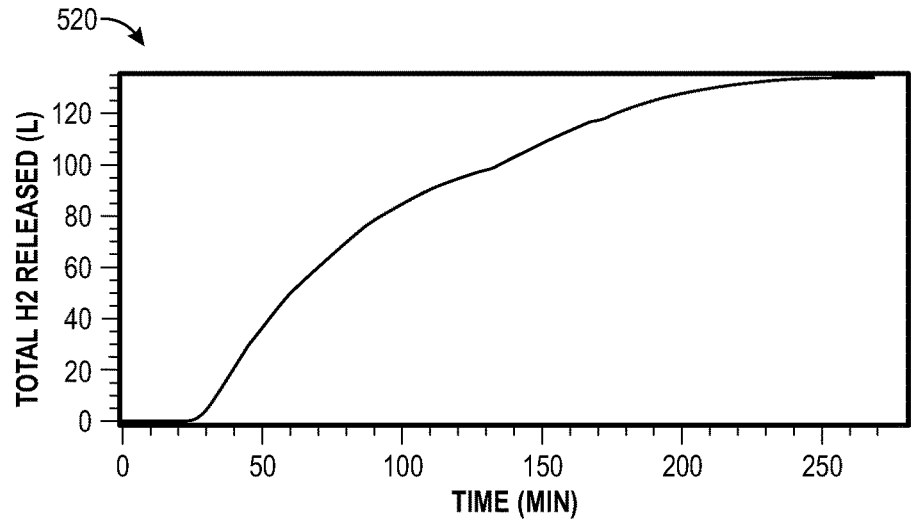
FIG. 5C illustrates a graph showing a total amount of hydrogen released from the canister (i.e., the integrated flow), according to an implementation.

Results from a thermal desorption test of the canister in Example 1 are shown in FIGS. 5A-5C. The Kanthal heater coil was powered using a 40 W power source (20 V, 2 A). FIG. 5A illustrates a graph 500 showing temperatures in the center of the canister (measured by the first thermocouple), on the inner wall of the canister (measured by the second thermocouple), and on an outer wall of the canister (measured by the third thermocouple), according to an implementation. No temperature difference between the outer and inner coils was observed once the set temperature was reached. The effect of the internal insulation was measured by the third thermocouple (e.g., outside the canister), which was about 50° C. to about 60° C. lower than the internal temperature.

FIG. 5B illustrates a graph 510 showing a hydrogen evolution rate (e.g., in L H2/min) from the canister, according to an implementation. The flow rate reached a maximum of 1.9 L/min at about 140° C. and then decreased. Faster discharge rates may be achieved by supplying a higher power (e.g., >40 W) to the heater coils.

FIG. 5C illustrates a graph 520 showing a total amount of hydrogen released from the canister (i.e., the integrated flow), according to an implementation. The total amount was about 130 L. The calculated amount of hydrogen in the canister (based on the data provided in Tables 1-5) was about 129 L (at room/ambient temperature), confirming that all of the hydrogen was evolved from the hydride during this test.

TABLE 1

| Hydride bed | $LiAlH_4$ |
|---|---|
| Mass (g) | 160 |
| Density (g/ml) | 0.917 |
| Packing | 0.55 |
| Volume ($cm^3$) | 317.2 |
| Enthalpy (kJ/mol) | 25.8 |
| H content (wt %) | 7.8 |
| Energy content (Wh) | 416 |

TABLE 2

| Heater Coil | |
|---|---|
| Wire type | Kanthal A-1 |
| Wire gauge | 20.0 |
| Resistivity (ohms/ft) | 0.9 |
| Length (ft) | 11.8 |
| Resistance (ohms) | 10.0 |
| Specific mass (g/ft) | 1.1 |
| Mass (g) | 13.1 |

TABLE 3

| Wire Insulation | |
|---|---|
| Type | Kapton tape |
| Area | Variable |
| Thickness (mil) | 8 |
| Mass (g) | 4.20 |

TABLE 4

| Canister Insulation | |
|---|---|
| Type | Pyrogel 2250 Ultra-conformable aerogel |
| Density (g/$in^3$) | 3.14 |
| Area ($in^2$) | 47.39 |
| Thickness (in) | 0.08 |
| Aerogel sleeve (g) | 10.1 |
| Aerogel cap 1 (g) | 0.91 |
| Aerogel cap 2 (g) | 0.92 |
| Total mass (g) | 11.93 |

TABLE 5

| Canister Assembly | $LiAlH_4$ |
|---|---|
| Material | Aluminum |
| Max pressure (psi) | 50 |
| Wall thickness (mm) | 0.46 |

TABLE 5-continued

| | |
|---|---|
| Diameter (cm) | 5.59 |
| Length (cm) | 13.46 |
| Volume (ml) | 330.10 |
| Number of TC | 3 |
| Mass cylinder | 36.12 |
| Mass heater cap | 5.35 |
| Mass outlet cap | 5.37 |
| Filter gasket | 3.48 |
| Outlet tube/fitting | 6.27 |
| Heater coil | 13.08 |
| Wire insulation | 4.20 |
| Canister insulation | 11.5 |
| Thermocouple mass | 0.52 |
| Lead wire/fittings | 4.98 |
| Silicone glue | 7.7 |
| Grey epoxy | 2.5 |
| Total canister | 101.0 |
| Total mass (g) | 261.0 |
| Scaling factor (M_hydride/(M_canister + M_hydride)) | 0.63 |
| Total energy | 416.0 |
| Specific energy (kWh/kg) | 1.6 |
| Energy density (kWh/L) | 1.3 |

Example 2

A power system was demonstrated using a canister similar to the one described in Example 1. The hydrogen gas output (i.e., H2) from the canister was connected to the input of a 150 W proton-exchange membrane (PEM) fuel cell. The electrical output from the fuel cell was connected in parallel to the heater coils (through a temperature control circuit) and to an external DC load, as shown in FIG. 4. The amount of power provided to the heater coils was determined by a temperature profile programmed into the temperature control circuit.

Figure 6A:
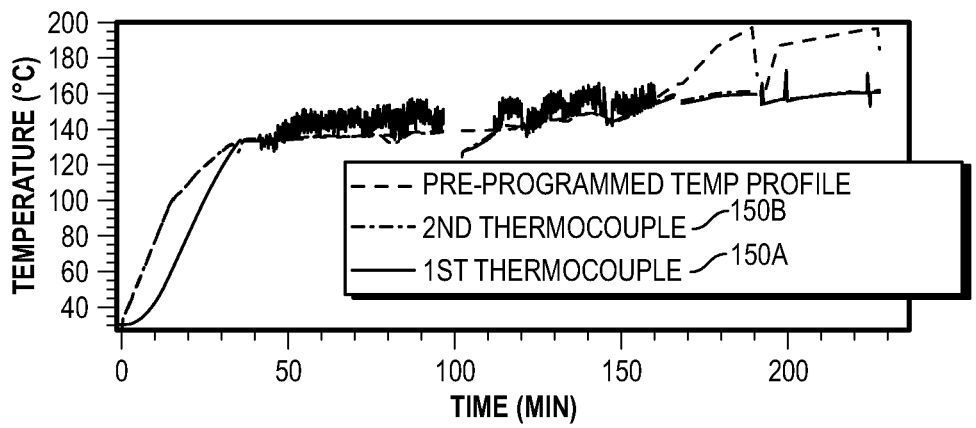
FIG. 6A illustrates a graph showing temperatures in the center of the canister, on the inner wall of the canister, and a pre-programed temperature set point, according to an implementation.
Figure 6B:
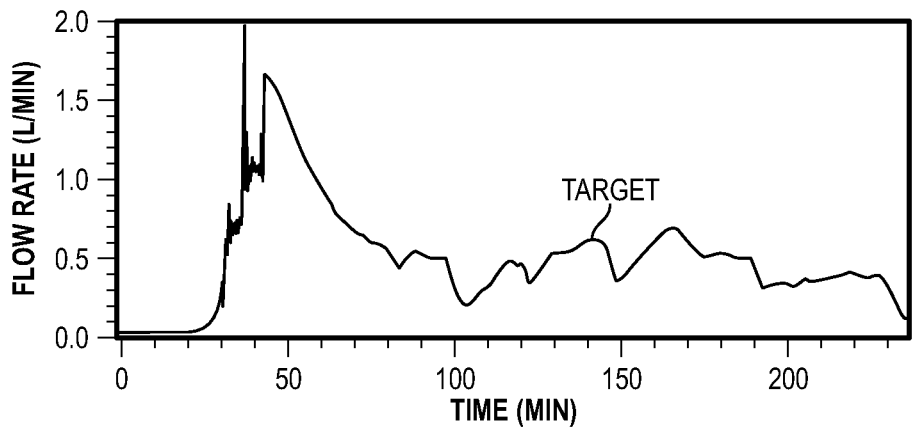
FIG. 6B illustrates a graph showing a hydrogen evolution rate (e.g., in L H2/min) from the canister with a dashed line showing a target rate of 0.5 L/min, according to an implementation.
Figure 6C:
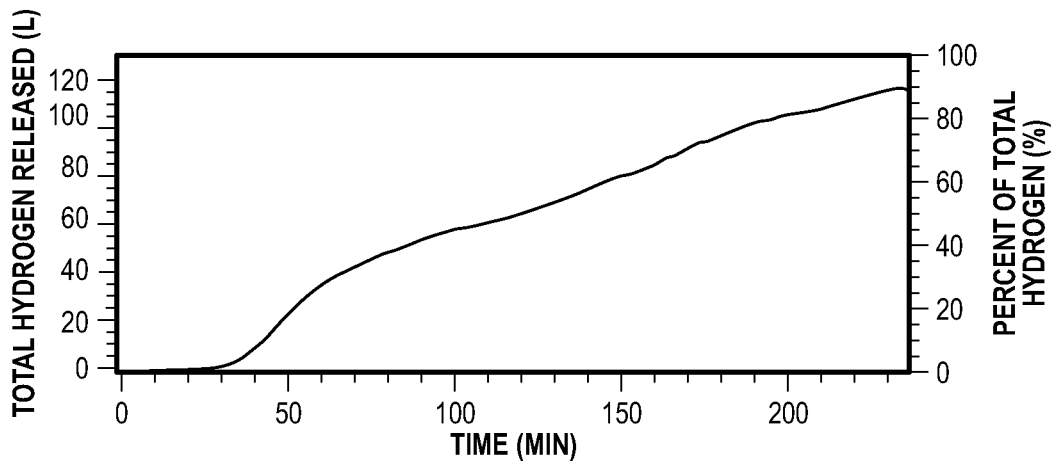
FIG. 6C illustrates a graph showing a total amount of hydrogen released from the canister (i.e., the integrated flow), according to an implementation.

Results from a test of the power system are shown in FIGS. 6A-6C and FIG. 7. More particularly, FIG. 6A illustrates a graph 600 showing temperatures in the center of the canister (measured by the first thermocouple), on the inner wall of the canister (measured by the second thermocouple), and the pre-programed temperature profile (e.g., the set point). FIG. 6B illustrates a graph 610 showing a hydrogen evolution rate (e.g., in L H2/min) from the canister with a dashed line showing a target rate of 0.5 L/min. FIG. 6C illustrates a graph 620 showing a total amount of hydrogen released from the canister (i.e., the integrated flow).

Figure 7:
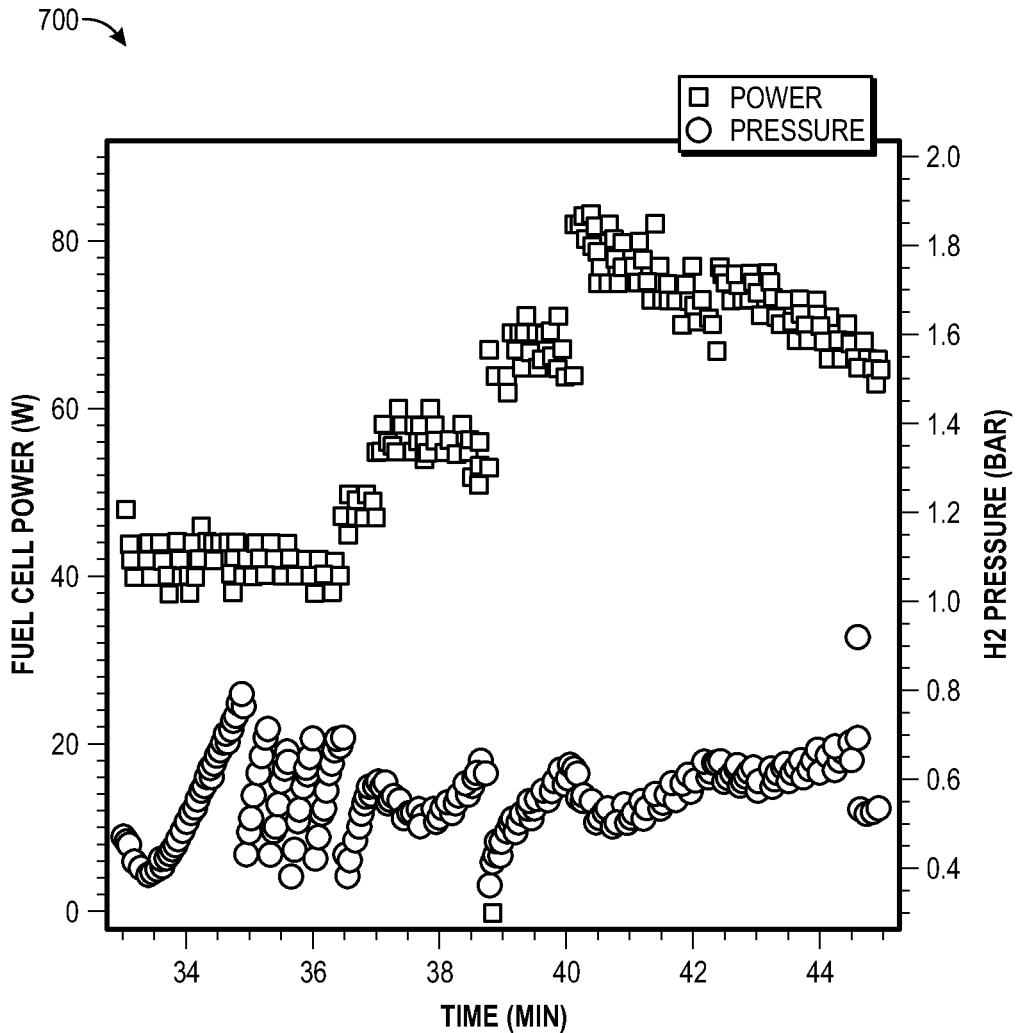
FIG. 7 illustrates a graph showing fuel cell power/performance and hydrogen pressure with respect to time, according to an implementation.

FIG. 7 illustrates a graph 700 showing fuel cell power/performance and hydrogen pressure with respect to time, according to an implementation. The fuel cell was supplied with hydrogen gas exclusively from the canister. At about 34 minutes, the total output of the fuel cell was about 40 W, which was the sum of the power going to the heater coils and the applied load (19 V). Over the next few minutes, the applied load was increased by decreasing the DC voltage set point on the applied load progressively down to 16 V. As the load voltage was decreased, the fuel cell output increased up to about 80 W.

Example 3

The canister described in Example 1 may be modified (e.g., to achieve higher specific energy) in a variety of ways, such as by using a thinner filter gasket, a higher heater wire gauge, commercial heater wire insulation, and/or a thinner aluminum wall thickness (of the body). The properties of an alternative $LiAlH_4$ canister design are shown in Tables 6-10 below. In this design, the specific energy of the canister is 1.96 kWh/kg, and the energy density is 1.34 kWh/L.

TABLE 6

| Hydride bed | $LiAlH_4$ |
|---|---|
| Mass (g) | 170 |
| Density (g/ml) | 0.917 |
| Packing | 0.55 |
| Volume (cm$^3$) | 337.1 |
| Enthalpy (kJ/mol) | 25.8 |
| H content (wt %) | 7.8 |
| Energy content (Wh) | 442 |

TABLE 7

| Heater Coil | |
|---|---|
| Wire type | Kanthal A-1 |
| Wire gauge | 20.0 |
| Resistivity (ohms/ft) | 0.9 |
| Length (ft) | 11.8 |
| Resistance (ohms) | 10.0 |
| Specific mass (g/ft) | 1.1 |
| Mass (g) | 13.1 |

TABLE 8

| Wire Insulation | |
|---|---|
| Type | Kapton tape |
| Area | |
| Thickness (mil) | |
| Mass (g) | 2 |

TABLE 9

| Canister Insulation | |
|---|---|
| Type | Pyrogel 2250 Ultra-conformable aerogel |
| Density (g/in$^3$) | 3.14 |
| Area (in$^2$) | 47.39 |
| Thickness (in) | 0.08 |
| Aerogel sleeve (g) | 10.1 |
| Aerogel cap 1 (g) | 0.91 |
| Aerogel cap 2 (g) | 0.92 |
| Total mass (g) | 11.93 |

TABLE 10

| Canister Assembly | $LiAlH_4$ |
|---|---|
| Material | Aluminum |
| Max pressure (psi) | 50 |
| Wall thickness (mm) | 0.46 |
| Diameter (cm) | 5.59 |
| Length (cm) | 13.46 |
| Volume (ml) | 330.10 |
| Number of TC | 3 |
| Mass cylinder | 17.1 |
| Mass heater cap | 2.7 |
| Mass outlet cap | 2.65 |
| Filter gasket | 1.16 |
| Outlet tube/fitting | 4 |
| Heater coil | 6.95 |
| Wire insulation | |
| Canister insulation | |
| Thermocouple mass | 0.18 |
| Lead wire/fittings | 3 |
| Silicone glue | 3.8 |
| Grey epoxy | 2.5 |

TABLE 10-continued

| | |
|---|---|
| Total canister | 55.5 |
| Total mass (g) | 225.5 |
| Scaling factor (M_hydride/(M_canister + M_hydride)) | 0.75 |
| Total energy (KWh/kg) | 442.00 |
| Specific energy | 1.96 |
| Energy density (kWh/L) | 1.34 |

Example 4

The canisters described in the Examples 1-3 may be further modified by replacing the $LiAlH_4$ with an alternative hydrogen carrier, such as aluminum hydride ($AlH_3$). $AlH_3$ has a higher crystalline density (e.g., about 1.5 g/cm$^3$), a lower desorption enthalpy (e.g., about 10 kJ/mol), and a higher gravimetric hydrogen content (e.g., about 10 wt % H) compared to $LiAlH_4$. The properties of a canister constructed using $AlH_3$, rather than $LiAlH_4$, are shown in Tables 11-15 below. Although the canister properties are similar, the use of $AlH_3$, rather than $LiAlH_4$, may result in a higher specific energy (e.g., 2.77 kWh/g) and a higher energy density (e.g., 2.73 Wh/cm$^3$).

TABLE 11

| | |
|---|---|
| Hydride bed | $AlH_3$ |
| Mass (g) | 270.4 |
| Density (g/ml) | 1.5 |
| Packing | 0.6 |
| Volume (cm$^3$) | 330 |
| Enthalpy (kJ/mol) | 10.0 |
| H content (wt %) | 10.0 |
| Energy content (Wh) | 901.5 |

TABLE 12

Heater Coil

| | |
|---|---|
| Wire type | |
| Wire gauge | 20.0 |
| Resistivity (ohms/ft) | 0.9 |
| Length (ft) | 11.8 |
| Resistance (ohms) | 10.0 |
| Specific mass (g/ft) | 1.1 |
| Mass (g) | 13.1 |

TABLE 13

Wire Insulation

| | |
|---|---|
| Type | Kapton coated |
| Area | |
| Thickness (mil) | |
| Mass (g) | 2 |

TABLE 14

Canister Insulation

| | |
|---|---|
| Type | Pyrogel 2250 Ultra-conformable aerogel |
| Density (g/in$^3$) | 3.14 |
| Area (in$^2$) | 47.39 |
| Thickness (in) | 0.08 |
| Aerogel sleeve (g) | 10.1 |
| Aerogel cap 1 (g) | 0.91 |

TABLE 14-continued

Canister Insulation

| | |
|---|---|
| Aerogel cap 2(g) | 0.92 |
| Total mass (g) | 11.93 |

TABLE 15

| | |
|---|---|
| Canister Assembly Material | |
| Max pressure (psi) | 50 |
| Wall thickness (mm) | 0.46 |
| Diameter (cm) | 5.59 |
| Length (cm) | 13.46 |
| Volume (ml) | 330.10 |
| Number of TC | 3 |
| Mass cylinder | 17.1 |
| Mass heater cap | 2.7 |
| Mass outlet cap | 2.65 |
| Filter gasket | 1.16 |
| Outlet tube/fitting | 4 |
| Heater coil | 6.95 |
| Wire insulation | |
| Canister insulation | |
| Thermocouple mass | 0.18 |
| Lead wire/fittings | 3 |
| Silicone glue | 3.8 |
| Grey epoxy | 2.5 |
| Total canister | 55.5 |
| Total mass (g) | 325.94 |
| Scaling factor (M_hydride/(M_canister + M_hydride)) | 0.83 |
| Total energy (KWh/kg) | 901.45 |
| Specific energy | 2.77 |
| Energy density (kWh/L) | 2.73 |

As illustrated above, the canister 100 may scale well from about 0.1 kWh to about 50 kWh and above. For example, the canister 100 may be part of a 200 W system running for 30 minutes at 0.1 kWh. In another example, the canister 100 may be part of a 5 kW system running for 10 hours at 50 kWh. If these energies are converted into a mass of the hydride bed, this may yield about 0.4 kg to about 20 kg for $LiAlH_4$ and about 0.03 kg to about 15 kg for $AlH_3$.

The scaling factor (e.g., the mass of the hydride bed divided by the sum of the mass of the canister 100 with the hydride bed therein) may be greater than about 0.5, greater than about 0.6, greater than about 0.7, greater than about 0.8, greater than about 0.9, greater than about 0.95, and/or less than about 1.0. In addition, the specific energy of/in the canister 100 may be from about 1.0 kWh/kg to about 3 kWh/kg based on a heating value of 120 kJ/g of hydrogen (e.g., the hydride bed) present. For example, the specific energy may be from about 1.9 kWh/kg to about 2.7 kWh/kg. Furthermore, the energy density of/in the canister 100 may be from about 1.3 kWh/L to about 3 kWh/L. For example, the energy density may be from about 2 kWh/L to about 2.7 kWh/L. The canister 100 may include a total amount of hydride from about 0.03 kg to about 20 kg. The canister 100 may include a total amount of energy stored of about 0.1 KWh to about 50 KWh.

Figure 8:
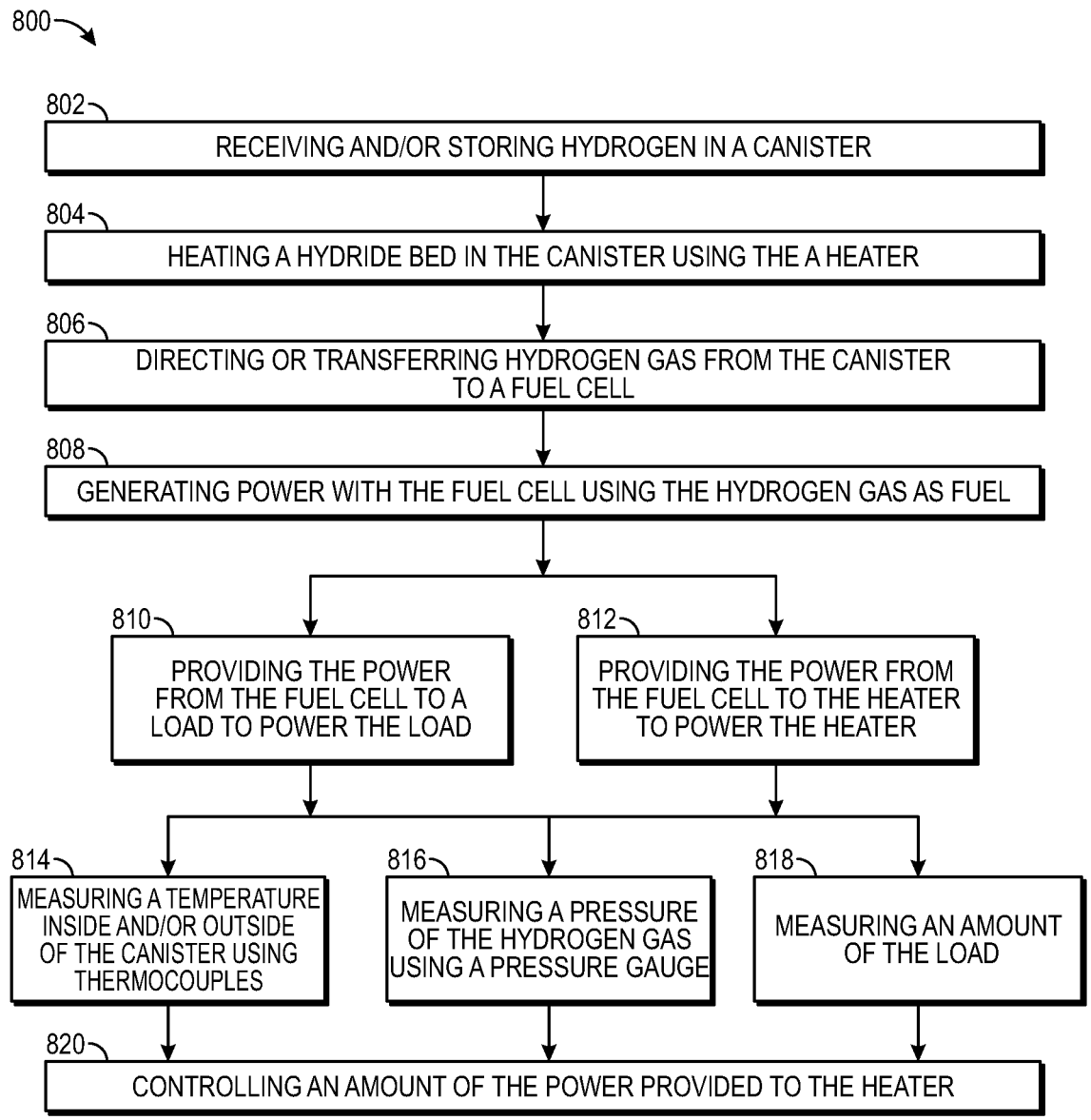
FIG. 8 illustrates a flowchart of a method for powering a load using stored hydrogen, according to an implementation.

FIG. 8 illustrates a flowchart of a method 800 for powering a load using stored hydrogen, according to an implementation. The method 800 is from the perspective of the system 400 and the components therein. It will be appreciated that the order of the steps provided below may vary and/or two or more of the steps may occur at least partially simultaneously.

The method 800 may include receiving and/or storing hydrogen in the canister 100, as at 802. The hydrogen may be stored as a solid hydride bed in the canister 100.

The method 800 may also include heating the hydride bed in the canister 100 using the heater elements 140A, 140B, as at 804. As discussed, above, the hydride bed may release hydrogen gas in response to being heated, and the hydrogen gas may flow out of the canister 100 via the fluid outlet 122.

The method 800 may also include directing or transferring the hydrogen gas from the canister 100 to the fuel cell 410, as at 806. The method 800 may also include generating power with the fuel cell 410 using the hydrogen gas as fuel, as at 808.

The method 800 may also include providing the power from the fuel cell 410 to a load 420 to power the load, as at 810. The method 800 may also include providing the power from the fuel cell 410 to the heater elements 140A, 140B to power the heater elements 140A, 140B, as at 812. The power may be used by the heater elements 140A, 140B to generate the heat discussed in step 804. In some implementations, step 812 may be omitted, and the heater elements 140A, 140B may be powered by a battery.

The method 800 may also include measuring a temperature inside and/or outside of the canister 100 using the temperature sensors 150A-150C, as at 814. The method 800 may also or instead include measuring a pressure of the hydrogen using the pressure gauge 440, as at 816. The pressure of the hydrogen may be measured inside the internal volume 112 of the canister 100. Alternatively, the pressure of the hydrogen may be measured after it flows out of the canister 100 on the way to the fuel cell 410. The method 800 may also or instead include measuring an amount of the load 420, as at 818. For example, the amount of the load 420 may vary over time.

The method 800 may also include controlling 820 (e.g., increasing, decreasing, or maintaining) an amount of the power provided to the heater elements 140A, 140B, as at 820. The amount of power provided to the heater elements 140A, 140B may be controlled with the temperature control circuit 430. As discussed above, the amount of power provided to the heater elements 140A, 140B may be directly proportional to the amount of heat generated by the heater elements 140A, 140B in the internal volume 112. The amount of power may be controlled in response to the temperature (measured at 814), the pressure (measured at 816), the amount of the load 420 (measured at 818), or a combination thereof.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A canister, comprising:
   a body defining a single, contiguous internal volume configured to have a hydride bed positioned therein, wherein the hydride bed comprises lithium aluminum hydride, aluminum hydride, or a combination thereof, wherein a scaling factor of the canister is greater than about 0.5 and less than about 1.0, wherein the scaling factor comprises a mass of the hydride bed divided by a mass of the canister with the hydride bed therein, and wherein the canister comprises at least 1.0 kWH/kg of energy;
   a first heater element positioned at least partially in the internal volume and embedded at least partially within the hydride bed, wherein the first heater element is oriented in a helical configuration, and wherein the first heater element is configured to heat the hydride bed substantially uniformly, thereby causing the hydride bed to release hydrogen; and
   a first temperature sensor positioned at least partially in the internal volume, wherein the first temperature sensor is configured to measure a temperature in the internal volume.

2. The canister of claim 1, further comprising a second heater element positioned at least partially in the internal volume, wherein the first heater element and the second heater element are oriented in a double helix configuration within the internal volume.

3. The canister of claim 2, wherein the first heater element is positioned radially-inward from the second heater element.

4. The canister of claim 3, wherein the first temperature sensor is coupled to the first heater element.

5. The canister of claim 4, further comprising a second temperature sensor that is coupled to the second heater element or to an inner surface of the body, wherein the second temperature sensor is configured to measure the temperature in the internal volume closer to the inner surface of the body than the first temperature sensor.

6. The canister of claim 5, further comprising a third temperature sensor that is coupled to an outer surface of the body, wherein the third temperature sensor is configured to measure a temperature of an outer surface of the body.

7. The canister of claim 5, wherein the body defines a first cable opening configured to have the first heater element extending therethrough and into the internal volume, and wherein the canister further comprises a first wire interconnect coupled to the body proximate to the first cable opening, wherein the first wire interconnect comprises:
an inner washer positioned in the internal volume;
an inner electrical connection positioned in the internal volume, wherein the inner washer is positioned between the inner electrical connection and the inner surface of the body;
an outer washer positioned outside of the body;
an outer electrical connection positioned outside of the body, wherein the outer washer is positioned between the outer electrical connection and the outer surface of the body; and
an adhesive positioned on the inner washer, the inner electrical connection, the outer washer, and the outer electrical connection.

8. The canister of claim 7, wherein the body further defines:
a second cable opening configured to have the second heater element extending therethrough and into the internal volume;
a third cable opening configured to have the first temperature sensor extending therethrough and into the internal volume; and
a fourth cable opening configured to have the second temperature sensor extending therethrough and into the internal volume.

9. The canister of claim 7, wherein the body defines a fluid opening through which the hydrogen flows, and wherein the canister further comprises:
an inner flange portion positioned in the internal volume, wherein the inner flange portion is at least partially frustoconical;
an outer nut portion positioned outside of the body; and
a connector extending at least partially through the fluid opening, wherein the inner flange portion and the outer nut portion are coupled to the connector.

10. The canister of claim 9, further comprising:
a filter coupled to the inner flange portion and configured to prevent particles in the hydrogen from flowing out of the canister; and
a tube extending at least partially through the fluid opening and the connector, wherein an end of the tube is positioned between the filter and the fluid opening.

11. A system, comprising:
a canister defining an internal volume configured to have a hydride bed positioned therein, wherein the canister comprises a heater element comprising first and second heater portions in the internal volume that are oriented in a concentric double helix configuration with the first helix portion being located radially inward from the second helix portion, wherein the canister comprises at least 1.0 kWH/kg of energy based on a heating value of 120 kJ/g of hydrogen present, wherein the hydride bed comprises lithium aluminum hydride, aluminum hydride, or a combination thereof, and wherein the hydride bed is configured to release hydrogen gas when heated to a predetermined temperature; and
a fuel cell configured to receive the hydrogen gas from the canister and to use the hydrogen gas as fuel to produce power for a load.

12. The system of claim 11, wherein a total amount of energy stored in the canister is from about 0.1 kWh to about 50 kWh, and wherein a mass of the hydride bed is from about 0.03 kg to about 20 kg.

13. The system of claim 11, wherein a scaling factor of the canister is greater than about 0.5 and less than about 1.0, and wherein the scaling factor comprises a mass of the hydride bed divided by a mass of the canister with the hydride bed therein.

14. The system of claim 11, wherein a specific energy of the canister is from about 1.9 kWh/kg to about 2.7 kWh/kg.

15. The system of claim 11, wherein an energy density of the canister is from about 2 kWh/L to about 2.7 kWh/L.

16. A method, comprising: storing a hydride bed in a canister; heating the hydride bed with a first heater element in the canister, which causes the hydride bed to release hydrogen gas, wherein the first heater element is oriented in a helical configuration: transferring the hydrogen gas from the canister to a fuel cell; generating power with the fuel cell using the hydrogen gas as fuel; and providing the power from the fuel cell to a load to power the load,
wherein a scaling factor of the canister is greater than about 0.5 and less than about 1.0; a specific energy of the canister is from about 1.9 kWh/kg to about 2.7 kWh/kg; and an energy density of the canister is from about 2 kWh/L to about 2.7 kWh/L.

17. The method of claim 16, further comprising providing the power from the fuel cell to the first heater element to power the first heater element.

18. The method of claim 16, further comprising:
measuring a first temperature inside the canister using a first temperature sensor, wherein the first temperature sensor is coupled to the first heater element;
measuring a second temperature inside the canister using a second temperature sensor, wherein the second temperature sensor is coupled to a second heater element in the canister, and wherein the first and second heater elements are oriented in a concentric double helix configuration; and
measuring a third temperature outside the canister using a third temperature sensor.

19. The method of claim 18, further comprising controlling an amount of heat generated in the canister with the first heater element and the second heater element based at least partially upon the first temperature and the second temperature, wherein the second heater element and the second temperature sensor are positioned closer to an inner surface of the canister than the first heater element and the first temperature sensor.

20. The canister of claim 1, further comprising a second heater element positioned at least partially in the internal volume, wherein the first heater element and the second heater element are oriented in a concentric double helix configuration within the internal volume.

21. The canister of claim 20, wherein the first and second heater elements are two portions of the same heater.

22. The canister of claim 1, further comprising a second heater element positioned at least partially in the internal volume, wherein the first heater element is oriented in a first helix configuration and the second heater element is oriented in a second helix configuration such that the first and second heater elements are oriented in a concentric double helix configuration with the first heater element being positioned radially inward from the second heater element.

23. The canister of claim 1, further comprising:
a second temperature sensor positioned at least partially in the internal volume, wherein the second temperature sensor is configured to measure the temperature in the internal volume closer to the inner surface of the body than the first temperature sensor; and a third temperature sensor positioned outside of the internal volume, wherein the third temperature sensor is configured to measure the temperature outside of the internal volume.

* * * * *